(No Model.) 6 Sheets—Sheet 1.
G. A. HOUSTON.
HEATING RAILROAD CARS OR OTHER STRUCTURES.

No. 415,272. Patented Nov. 19, 1889.

WITNESSES:
Harry Bitner.
W. H. Hill

INVENTOR
George A. Houston
BY
Hill & Dixon
His ATTORNEYS.

(No Model.) 6 Sheets—Sheet 2.
G. A. HOUSTON.
HEATING RAILROAD CARS OR OTHER STRUCTURES.
No. 415,272. Patented Nov. 19, 1889.
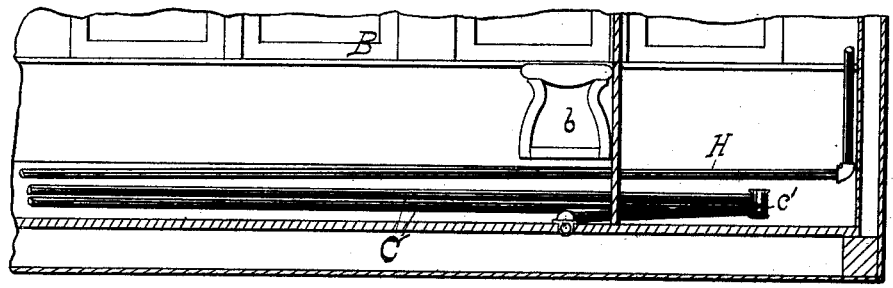
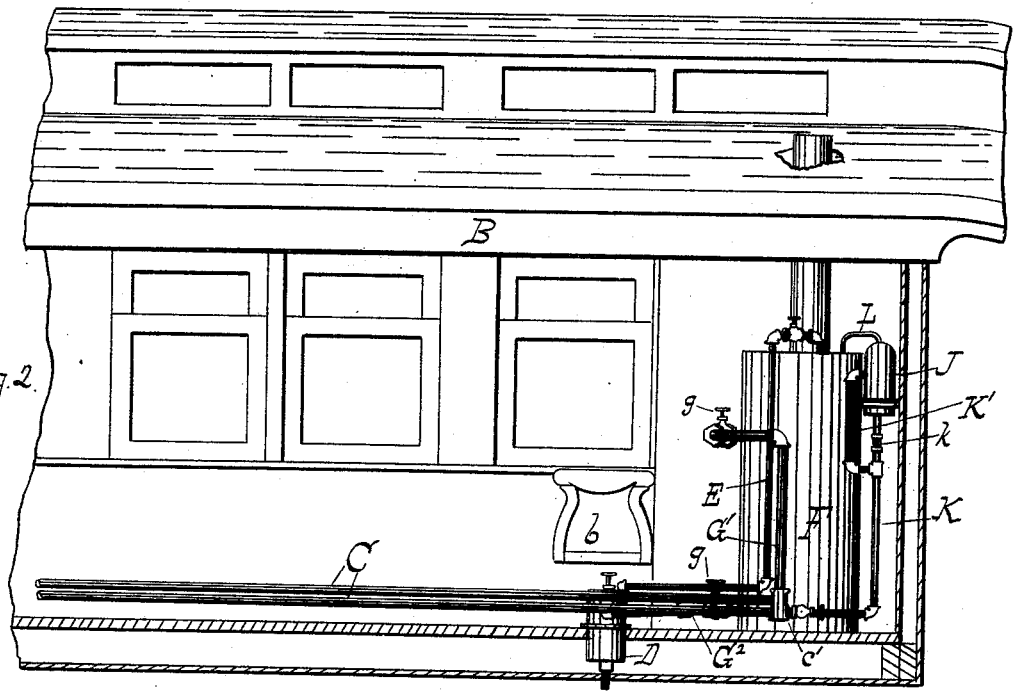

(No Model.) 6 Sheets—Sheet 3.
G. A. HOUSTON.
HEATING RAILROAD CARS OR OTHER STRUCTURES.
No. 415,272. Patented Nov. 19, 1889.
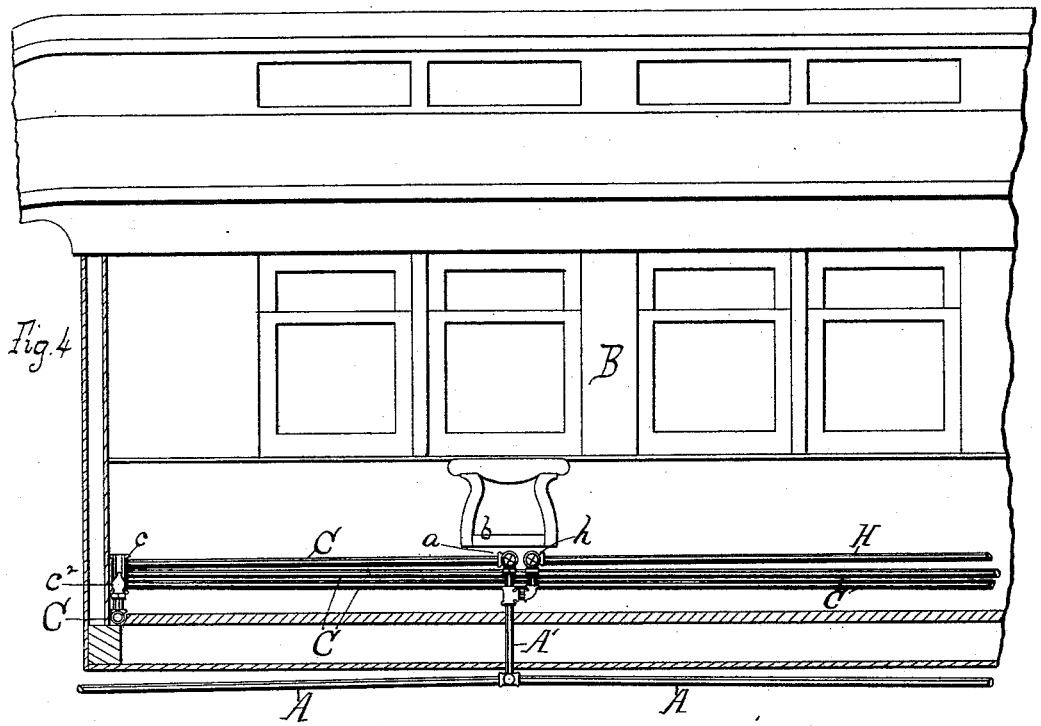
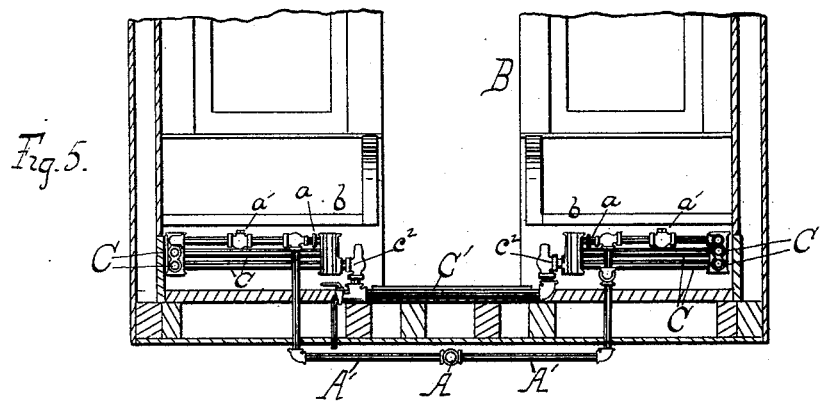
WITNESSES:
Harry Bitner
W. H. Hill
INVENTOR
George A. Houston
BY
Hill & Dixon
His ATTORNEYS.

(No Model.) 6 Sheets—Sheet 4.
G. A. HOUSTON.
HEATING RAILROAD CARS OR OTHER STRUCTURES.
No. 415,272. Patented Nov. 19, 1889.
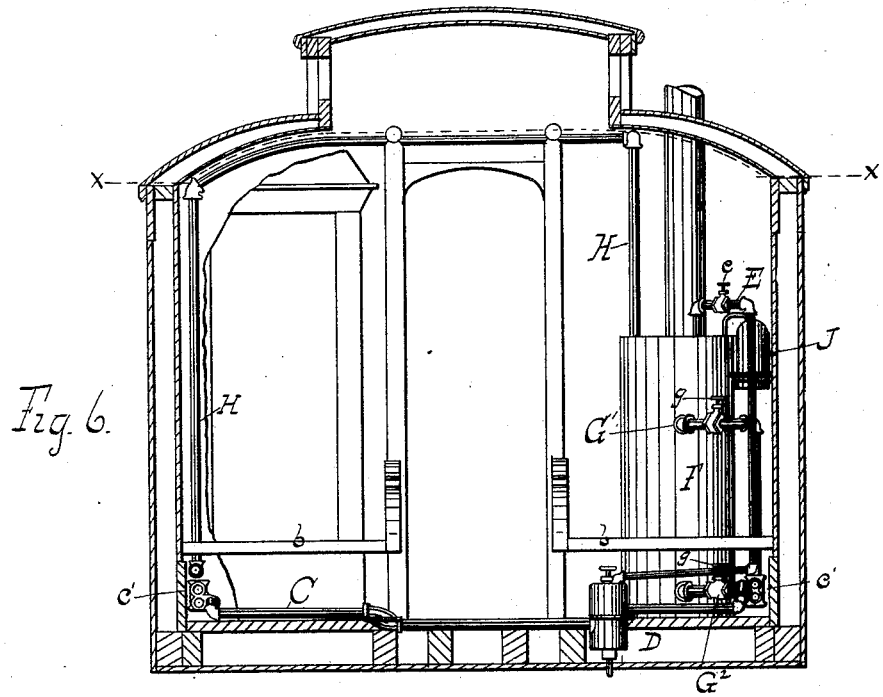
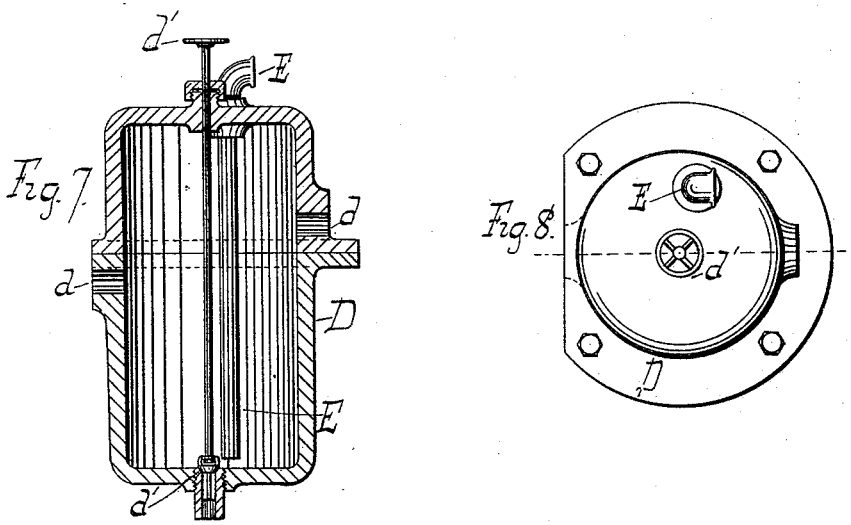
WITNESSES:
Harry Bitner.
W. H. Hill
INVENTOR
George A. Houston
BY
Hill & Dixon
His ATTORNEYS.
N. PETERS. Photo-Lithographer. Washington. D. C.

(No Model.) 6 Sheets—Sheet 5.

G. A. HOUSTON.
HEATING RAILROAD CARS OR OTHER STRUCTURES.

No. 415,272. Patented Nov. 19, 1889.

WITNESSES:
John B. Phillips
Harry Bitner

INVENTOR
George A. Houston
BY
Hill & Dixon
His ATTORNEYS.

(No Model.) 6 Sheets—Sheet 6.

G. A. HOUSTON.
HEATING RAILROAD CARS OR OTHER STRUCTURES.

No. 415,272. Patented Nov. 19, 1889.

WITNESSES:
Harry Bitner
W. M. Hill

INVENTOR
George A. Houston
-BY
Hill & Dixon
His ATTORNEYS.

UNITED STATES PATENT OFFICE.

GEORGE A. HOUSTON, OF BELOIT, WISCONSIN.

HEATING RAILROAD-CARS OR OTHER STRUCTURES.

SPECIFICATION forming part of Letters Patent No. 415,272, dated November 19, 1889.

Application filed May 10, 1888. Serial No. 273,387. (No model.)

*To all whom it may concern:*

Be it known that I, GEORGE A. HOUSTON, a citizen of the United States of America, residing at Beloit, in the county of Rock and State of Wisconsin, have invented certain new and useful Improvements in Heating Railroad-Cars and other Structures, of which the following is a specification.

Figure 1:
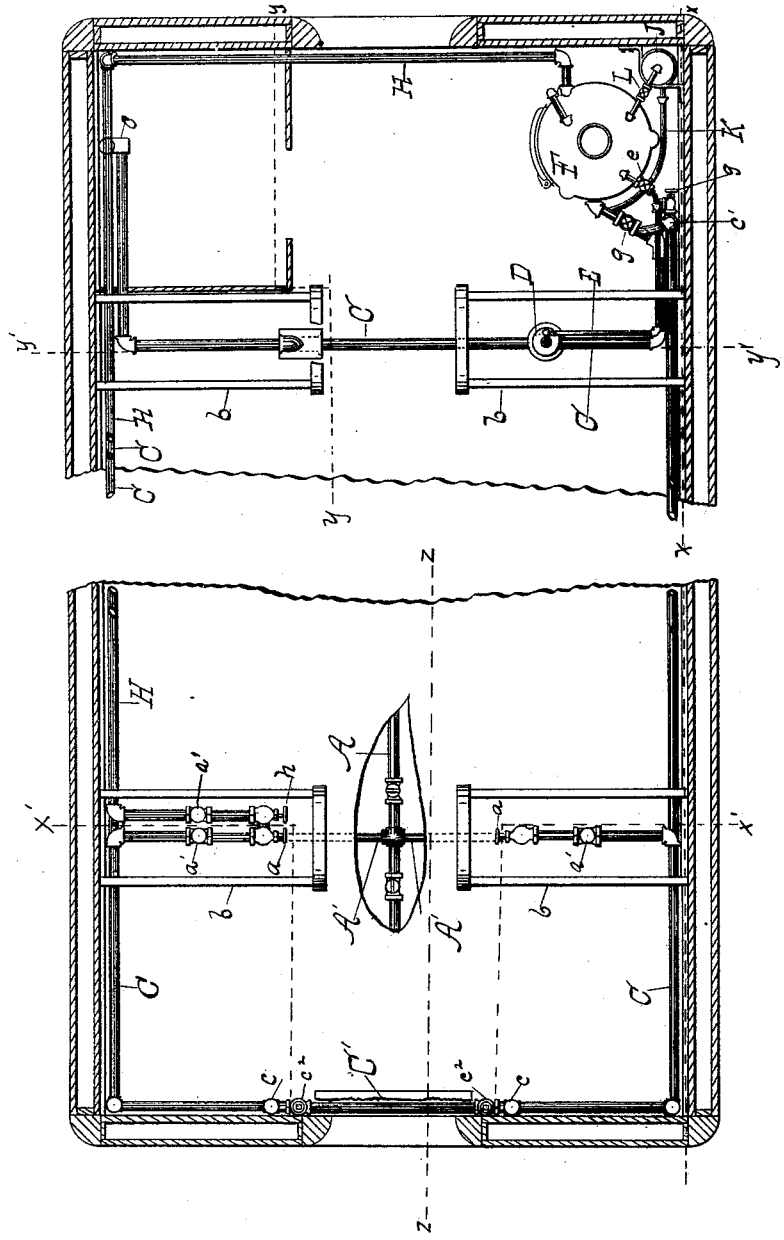
Figure 9:
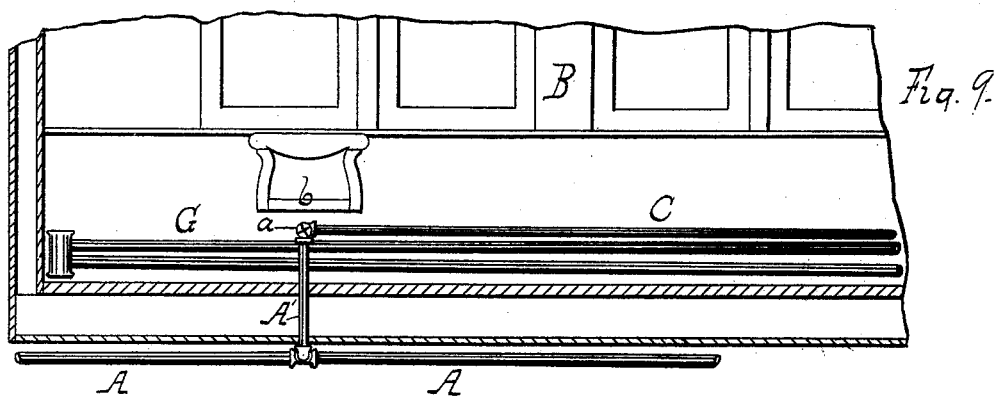
Figure 10:
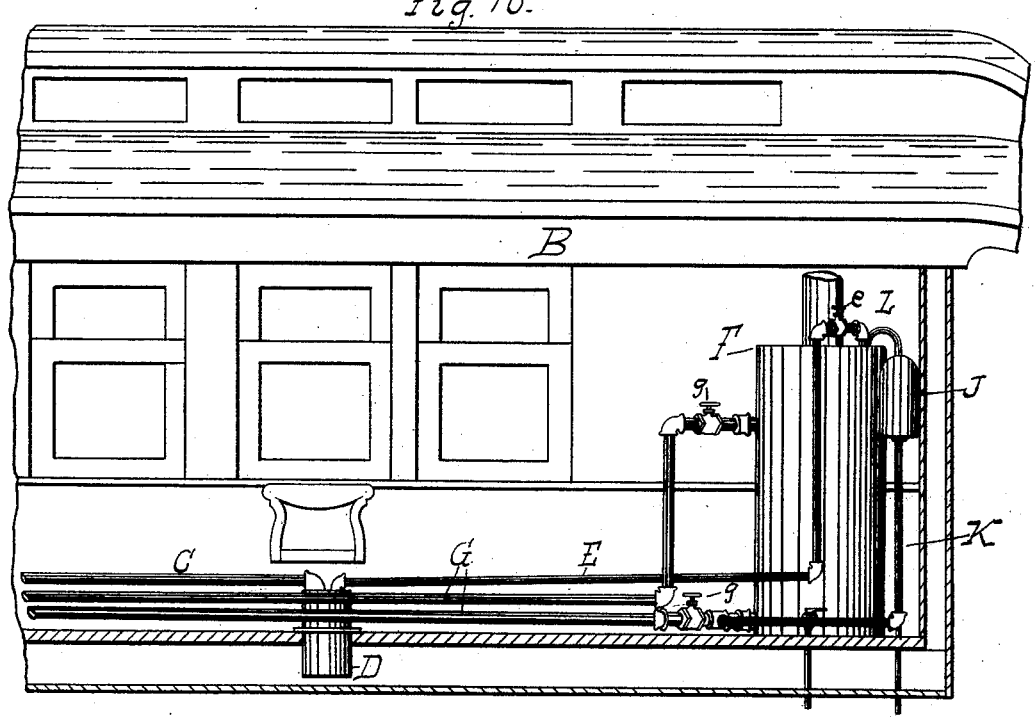

Referring to the accompanying drawings, which illustrate my preferred form of apparatus with certain of its obvious modifications in their application to a railroad-car, Figure 1 is a horizontal section in line $x\,x$ of Fig. 6; Fig. 2, a vertical section in line $x\,x$ of Fig. 1; Fig. 3, a similar section in line $y\,y$ of Fig. 1; Fig. 4, a similar section in line $z\,z$ of Fig. 1; Fig. 5, a transverse section in line $x'\,x'$ of Fig. 1; Fig. 6, a similar section in line $y'\,y'$ of Fig. 1; Fig. 7, a vertical section of the drip-pot; Fig. 8, a top plan of the same; Figs. 9 and 10, sectional elevations representing the independent water-circulation; and Fig. 11, a vertical section through the supplementary heater and automatic water-regulator, showing also the fire-regulator.

Similar reference-letters indicate like parts.

I have devised and put into successful practical use for the purpose of warming railroad-cars and other structures a new system of heating containing several important improvements, some of which consist in improved processes or methods and others in improved mechanical devices and combinations for carrying said processes or methods into practice.

This application relates to the mechanical apparatus employed in my new system, the improved processes or methods being reserved to form the subject of another application, and being described here only so far as may be necessary to the full explanation of the purpose and mode of operation of the mechanical improvements herein set forth.

I am aware that cars and other buildings have been heated in some instances by direct radiation from steam-pipes and in other instances by direct radiation from hot-water pipes, and that in the latter case it has been proposed to heat the water by steam, and I do not claim either of these methods by itself. My invention is distinctive in that it combines all three of them in one apparatus, containing in its entirety means for heating the car or building by steam alone or by a hot-water circulation alone, or by both, together with means for normally keeping the water hot by the action of the steam and for heating it independently of the steam.

The novel principle of my invention therefore consists, in its broad sense, in combining a steam-heating circulation with a hot-water circulation in which the water is normally kept hot by the action of the steam, so that the car or building can be quickly warmed up and its temperature then maintained by direct radiation from the steam-pipes; but if at any time the steam is temporarily cut off a hot-water circulation is instantly available to continue its work.

In the drawings, B represents the body of the car, and A is a "train-pipe," suitably jacketed to prevent radiation, and arranged so as to drain dry when the cars are uncoupled—a result which may be effected either by having it inclined slightly from one end to the other or upward from both ends to a point under the body of the car. The pipes A of the several cars in a train are united by suitable flexible couplings between the cars in the usual manner and connected to the locomotive boiler or exhaust, or both, so as to supply the several cars with steam for heating purposes.

At a suitable point or points I take steam from the main pipe A by means of a lateral branch or lateral branches $A'\,A'$, which come up through the floor of the car under the seat-frames $b$, and there connect with the steam-heating pipes C at the highest point of the latter. I prefer to arrange a separate steam-heating system on each side of the car and to control the admission of steam thereto by a cock $a$, so as to be able to correct any inequality of temperature that may result from the action of a cold wind against one side of the train; and I place a check-valve $a'$ in the pipes C near each cock $a$ for the quadruple purpose of holding and steadying the steam-pressure in the pipes C while the locomotive is attached, enforcing the proper steam-circulation, preventing the steam from escaping from the heating system of a car when, for any reason, the cars are separated, and automatically prevent the water from flowing from the pipes C into the train-pipe A when water is admitted from the reservoir into the pipes C to warm the car.

My preferred arrangement of heating-pipes is as follows: From the upper ends of the branches A', under the seat-frames and about a foot above the car-floor, I extend the pipe C to the side of the car, thence to the nearest end, and thence along the end to the vicinity of the door-frame, where it connects to a vertical pipe-coupling or T, (shown at $c$,) from which, either in single or multiple form, it runs back to the side of the car, and thence along the truss-plank to the opposite end, where it connects to another T, (shown at $c'$,) and thence in the form of a single pipe extends back along the truss-plank to one of the seat-frames, where it bends at right angles and runs to a drip-pot D, arranged in the floor under one of the seats. On that side of the car where the drip-pot is situated the pipe C will make a direct connection with it; but on the opposite side it will be extended, first under the seat, then down to the floor, and across in the floor to the drip-pot at the opposite side of the aisle. The course of the entire pipe system is slightly downward from the point where it takes steam at the cocks $a$ to the points where it enters the opposite sides of the drip-pot at or near the level of the floor, so that all the water of condensation formed in the steam-heating pipes will flow into the drip-pot. The two couplings $c$ $c$ at the door-frame are connected by a pipe-section C', which extends down to the floor and across it at the edge of the lintel, and cocks $c^2$ $c^2$ are provided, by which this section may be closed while heating by steam.

As shown in Fig. 7, the drip-pot consists of a closed shell adapted to receive the ends of the pipes C at the points $d$ $d$, provided with a drain-cock $d'$, for draining the entire system whenever desirable, and with a dip-pipe E, which extends through its upper end down nearly to its bottom and connects it to the upper end of a more elevated tank F, arranged in one corner of the car. The effect of this arrangement is, that when the water of condensation rises in the drip-pot so as to reach the lower end of pipe E the steam-pressure in the system will force it through pipe E into the tank, thereby gradually filling the latter with hot water of condensation, and the constant or intermittent access of such water, together with the access of steam through pipe E when the water is not flowing, will keep the water in the tank always hot and ready for instant use whenever desired. A cock $e$ is placed in the pipe E near the tank in order to control the discharge through it. By thus forcing the water of condensation into the tank I am enabled to keep the steam-pipes clear and the tank charged without the necessity of any care or attention on the part of the attendant, and I save and utilize a considerable amount of heat that would otherwise be wasted, and also obtain a chemically-pure water for the purposes of my water-circulation. When desirable, however, the tank may be charged through a filling-cock $f$ with water from any available source, and, however charged, its water may be heated by steam independently of pipe E, if desired. To this end it is only necessary to arrange some portion of the steam-pipe in such relation to the tank that heat will be communicated from the former to the water in the latter to a sufficient degree for the purpose required, and I have found this to be accomplished in the simplest and best way by leading a branch pipe H from some of the steam-pipes to the steam-space of the tank, so as to discharge a portion of steam directly into the tank.

In order to moderately warm the car in mild weather, I sometimes desire to heat the tank by steam without establishing an active steam-circulation in the pipes C, and to this end I prefer to connect the branch H to one of the lateral branches A' and provide it with a controlling-cock $h$, whereby it can take steam from the main pipe A even when the cocks $a$ $a$ are closed. The water thus collected or placed in the tank and kept heated is designed to be circulated through a heat-radiating pipe system for the purpose of heating the car by hot water whenever for any reason the steam is cut off. This may be accomplished in either of two ways, to wit: first, by circulating the heated water through a pipe system entirely separate from the steam-pipes, as shown in Figs. 9 and 10, (where C represents the steam-pipes and G the water-pipes,) or, secondly and preferably, by circulating it through the steam-pipes themselves, as shown in the remaining figures of the drawings. In either case the pipe or pipes through which the water-circulation is to be established are connected both to the upper and lower portions of the water-space in the tank, so as to permit the hot water to flow from the tank through the upper connection into the circulating system and return through the lower connection, a cock $g$ being provided for each connection to enable the attendant to control the admission of water into the pipes and to regulate its circulation through them. In those cases where the constructer prefers to circulate the water independently of the steam-pipes, he extends the ends of the water-pipes G G directly into the upper and lower parts of the water-space in the tank, as shown in Figs. 9 and 10; but where he prefers to use the steam-pipes C for his water-circulation he connects the upper part of said water-space to the upper portion of the steam-pipes by means of a connecting branch G' and the lower part of said space to the lower portion of the steam-pipes by another branch $G^2$, taking care that the branches G' $G^2$ shall not be so inclined as to obstruct the water-circulation. Prior to the opening of the cocks $g$ $g$ to admit the tank-water into the steam-pipes the attendant should open the cocks $c^2$ $c^2$ to let the water circulate entirely around the car, in which case it will flow from the upper connection G' to the pipes C at the side of the car on which the tank is situated, thence by said pipes to the farther end of the car, thence across through the section C' to the opposite pipes C, and back through them to the end of the car from which it started, and thence across through the drip-pot D and the lower connection $G^2$ to the tank. If the car is connected to the locomotive or other source of steam during the water-circulation, the cocks $a$ $a$ should also be closed; if not so connected, the check-valves $a'$ will be sufficient to prevent any escape of water from the steam-pipes. When it becomes desirable to charge the pipes again with steam, the water can be drained from them by the cock $d'$, and other suitable drain-cocks may be provided for the steam and water pipes at such points as the judgment of the constructer may approve.

It will be observed that when separate pipe systems are provided for the steam and water circulations, respectively, the car may be heated by steam and hot water either simultaneously or consecutively. When, however, the steam-pipes are arranged to receive the water-circulation, the car will normally be heated by steam, and the water will ordinarily be used only when the car is detached from the locomotive or the steam-supply temporarily cut off; but if only a very gentle warmth is required the cocks $a$ $a$ may be closed and the cocks $g$ $g$, $c^2$ $c^2$, and $h$ opened, in which case the water merely warmed by the steam from pipe H will circulate through the system.

Figure 11:
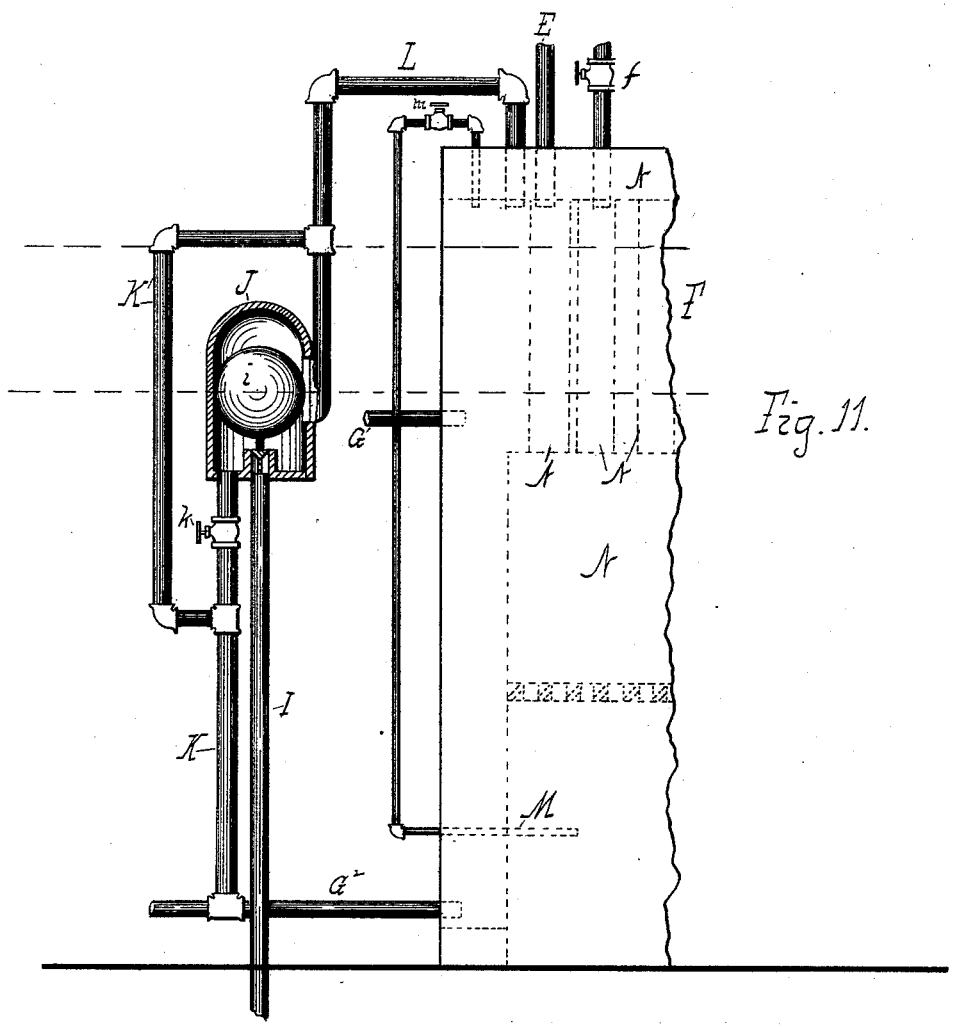

As a further improvement I provide the tank with a heater N, consisting of a fire-pot and smoke-flue of any suitable construction and adapted to any preferred form of fuel, solid, liquid, or gaseous, one form of such heater adapted to the use of solid fuel being represented in Fig. 11. While the train is running and steam is available, this supplementary heater will not be used; but if the car should be detached or from any other cause steam should not be available a fire can be made in the heater and the car be heated by a hot-water circulation for an indefinite time.

When the system is working by steam and the tank charging automatically with the water of its condensation, it becomes necessary to prevent it from being overcharged, and to this end I provide it with an overflow or relief device of any suitable construction. In Fig. 11 I have shown an improved device for this purpose, consisting, essentially, in an overflow port or passage I, provided with a float-valve $i$, which is normally seated to cut cut off the escape of steam, but which unseats when the water rises above its normal line, and thus allows the excess to drain off. In the form here shown the valve is arranged in a separate box or casing J, the lower end of which is connected by a pipe K to the lower end of the water-space and the upper end by a pipe L to the steam-space, thereby equalizing the steam-pressure on the valve.

When the water-circulation pipes are fully charged, it is desirable that the water-level in the tank should be maintained but slightly above the branch G', in order that the hottest water may flow into the circulation; but it is equally desirable that before the circulation-pipes are charged the tank should contain a sufficient reserve of water to charge those pipes upon the opening of the cocks $g$ without descending below the normal line. I therefore arrange the apparatus to overflow at two different levels by simply placing a cock $k$ in pipe K and allowing the water to pass around it when closed through a lateral branch K', the highest portion of which is on a level with the upper water-line. When the circulation-pipes have been fully charged, the cock $k$ is to be opened to maintain the water in the tank at its lower or normal working-level; but when the cocks $g$ $g$ are closed to cut off the water-circulation the cock $k$ is also to be closed to enable the tank to collect a sufficient surplus to fill the circulation again when required. The overflow-pipe I, taking its water from the lower end of the tank or the return-pipe near thereto, discharges only the cooler water of the tank.

When the car is separated from the train or the steam-supply otherwise interrupted and the water-circulation is resorted to, with a fire in the supplementary heater to maintain its temperature, the attendant might through carelessness allow the fire to become too strong, thereby not only wasting fuel, but possibly generating steam in the tank to such a degree of pressure as to endanger its safety. The fire should be so regulated as to keep the upper stratum of water at about 212° Fahrenheit without generating any material steam-pressure, and, as the attendant cannot always be relied upon to do this, I have contrived a regulator which accomplishes the result automatically. This automatic regulating device consists simply in a small pipe M, that extends from the steam-space in the tank down to the fire in the heater, and is provided with a controlling-cock $m$, which is normally closed, but is to be opened whenever a fire is made. This pipe performs no function so long as the fire does not generate steam or vapor in the tank; but the moment that either is generated it passes through the pipe and is discharged into the fire, deadening the latter and carrying off a portion of its superfluous heat through the smoke-flue. I prefer to discharge the steam into the ash-space under the grate, where it will mingle with the cool air-draft and be condensed into vapor before passing into the fire-bed, and where it will have ample room to expand, so as to act uniformly and at the same time gently upon the fire; but this arrangement is not an indispensable element of the invention. When, through the action of the steam or vapor, the fire becomes sufficiently deadened, steam ceases to be generated, and under the influence of the air-draft alone the fire brightens up again until the same operation is repeated. The intermittent action of the steam and air-draft thus holds the water substantially at the desired temperature, relieves the tank from the possibility of any undue steam-pressure, and prevents all unnecessary consumption of fuel. Moreover, the free passage from the main steam-pipe A to the regulating-pipe M when the cocks $a\,a$ or $h$ are opened enables the steam from the locomotive to extinguish whatever fire may remain in the heater when the car is coupled to the train or the steam again let on, after which the cock $m$ is to be closed.

The pressure of steam throughout the system is regulated by the usual relief-valve at the rear end of the train, or in any other way that may be preferred thereto.

In the practical operation of this system in cold weather the attendant, whenever the car is connected to the train, closes the cocks $g\,g$ $k\,c^2\,c^2\,m$ and opens the cocks $a\,a$. He then opens the valve $d'$ for a moment until the steam blows through, in order to assure himself that the pipes are clear and in working order. The car begins at once to warm up by direct radiation from the steam-pipes, and as soon as the valve $d'$ is closed water of condensation begins to collect in the drip-pot and pass over into the tank F, gradually filling the latter to its upper water-level. Should the steam-supply be cut off from any cause, the attendant reverses the cocks, and the hot-water circulation instantly takes the place of the steam and continues its work. Should the interruption of the steam-supply be prolonged for a considerable time, he makes a small fire in the heater, and thus is enabled to keep up the heating circulation as long as he wishes. In warmer weather he can preliminarily warm up the car by steam, close the cocks $a\,a$, and charge the water-pipes with hot water of condensation, as above described, and then, by opening the cock $h$, keep the circulation-water gently heated by the action of the steam; or, without letting on the steam or water circulation, he may open the cock $h$ and let steam directly into the tank and through it to a small extent into the heating-pipes, thereby getting a moderate degree of warmth diffused through the car. In the latter case the water of condensation will run into the drip-pot, and may from time to time be discharged by opening the valve $d'$.

The form and arrangement of the parts may be varied indefinitely so long as their general mode of operation is not affected, and the several improvements herein described may be used separately or conjointly.

It will be observed that by arranging the drip-pot so as not to be exposed to the air beneath the car, and by causing the water of condensation which it collects to be forced up into a receiving-tank, I am enabled to place all the working parts of the system within the body of the car, where they are conveniently accessible and are protected from freezing.

Having thus described my invention, what I claim as new, and desire to secure by Letters Patent, is—

1. The combination of a main pipe receiving steam from the engine boiler or exhaust, or both, a system of circulation-pipes receiving steam from said main and adapted to radiate its heat within a car or building for the purpose of warming the same, a water-reservoir communicating with pipes through which its contained water may be circulated from the upper part of the water-space to warm the same car or building and returned to the lower part of said water-space, and adapted to contain a sufficient quantity to charge said pipes and maintain the circulation therein, cocks for controlling the delivery of water from said reservoir to its water-circulation pipes, and means for heating the water contained in said reservoir by steam derived directly or indirectly from the steam-main, substantially as described.

2. The combination of a main pipe receiving steam from the engine boiler or exhaust, or both, a system of circulation-pipes receiving steam from said main and adapted to radiate its heat within a car or building for the purpose of warming the same, a water-reservoir communicating with pipes through which its contained water may be circulated from the upper part of the water-space to warm the same car or building and returned to the lower part of said water-space, and adapted to contain a sufficient quantity to charge said pipes and maintain the circulation therein, cocks for controlling the delivery of water from said reservoir to its water-circulation pipes, and a pipe E, extending from the lower portion of the steam-circulation pipes to the upper part of the reservoir for the purpose of automatically charging the latter with condensation-water from the steam-pipes, the whole being so constructed and arranged that when steam is circulating from the main the reservoir is storing condensation-water and the steam is keeping it hot, and when the steam is cut off the stored hot water can be instantly utilized for charging the circulation-pipes with or without the use of a local heater, substantially as described.

3. The combination of a system of pipes for radiating steam heat into a car or building, a water-reservoir communicating with pipes through which water may be circulated from the reservoir to warm the same car or building, a drip-pot D, and dip-pipe E, to receive the water of condensation from the steam-pipes and force it into the reservoir, and an automatic relief-valve to prevent the water from rising above a predetermined level in the reservoir, substantially as described.

4. In combination with a water-tank and a system of water-circulating pipes connected therewith, an automatic double-acting relief-valve device consisting, essentially, of the following elements, viz: a floating valve arranged in a separate casing, two passages to admit water from the tank to the casing at different levels, a stop-cock in the lower of said passages, and a discharge-pipe connected to the casing and adapted to be opened and closed by the floating valve, substantially as described.

5. The combination of a water-heater with an ample passage for conducting steam or vapor from the steam-space and delivering it to the fire to regulate and limit the intensity of combustion, substantially as described.

6. The combination of a system of steam-heating pipes, a stove or furnace, and an ample passage for conducting steam from one of the steam-pipes and delivering it to the fire, whereby the admission of steam into the steam-pipes automatically effects the extinguishment of the fire in the stove or furnace, substantially as described.

7. In a heating system for railroad-cars and other structures, the combination of the main pipe A, extending through the train for the purpose of supplying steam to the several cars thereof, the heating-pipes C, arranged within the car and communicating with the main steam-pipe A, the reservoir F, connected to the pipes C and adapted to charge them with water when desirable so to do, and a check-valve $a'$, arranged in the pipes C at or near their junction with the pipe A and automatically seating backward toward the latter pipe, substantially as and for the purposes set forth.

GEO. A. HOUSTON.

Witnesses:
MALCOLM HILL,
HARRY BITNER.